(12) United States Patent
Spencer et al.

(10) Patent No.: US 8,392,706 B2
(45) Date of Patent: Mar. 5, 2013

(54) METHOD AND SYSTEM FOR SEARCHING FOR, AND COLLECTING, ELECTRONICALLY-STORED INFORMATION

(75) Inventors: Elliot Spencer, Bedfordshire (GB);
Samuel J. Baker, Belden, MS (US);
Erik Andersen, Springville, UT (US)

(73) Assignee: Perlustro, L.P., Belden, MI (US)

( * ) Notice: Subject to any disclaimer, the term of this patent is extended or adjusted under 35 U.S.C. 154(b) by 466 days.

(21) Appl. No.: 12/626,517

(22) Filed: Nov. 25, 2009

(65) Prior Publication Data

US 2010/0138653 A1  Jun. 3, 2010

Related U.S. Application Data

(60) Provisional application No. 61/118,131, filed on Nov. 26, 2008.

(51) Int. Cl.
*G06F 21/00* (2006.01)

(52) U.S. Cl. ........ 713/167; 709/225; 709/226; 709/227; 709/228; 709/229

(58) Field of Classification Search .......... 713/165–167; 707/769–770
See application file for complete search history.

(56) References Cited

U.S. PATENT DOCUMENTS

| 6,950,943 | B1* | 9/2005 | Bacha et al. | 726/21 |
| 2007/0255686 | A1* | 11/2007 | Kemp et al. | 707/3 |
| 2009/0287665 | A1* | 11/2009 | Prahlad et al. | 707/3 |

\* cited by examiner

*Primary Examiner* — David Cervetti
*Assistant Examiner* — Ghazal Shehni
(74) *Attorney, Agent, or Firm* — Schwegman Lundberg & Woessner, P.A.

(57) ABSTRACT

A method and system for searching and collecting electronically stored information are described. Consistent with an embodiment of the invention, configuration and execution of a search are separated in time and location. For example, a search configuration application executing at a first computer system is utilized to generate a search configuration file, which controls the operation of a search agent when the search agent is executing at a target computer system and performing a search of storage devices act of the target computer system. Encryption is utilized to prevent unauthorized access to the search configuration file as well as the search results file generated by the search agent.

21 Claims, 7 Drawing Sheets

METHOD AND SYSTEM FOR SEARCHING FOR, AND COLLECTING, ELECTRONICALLY-STORED INFORMATION

RELATED APPLICATIONS

This patent application claims the benefit of the filing date of the provisional patent application with Application Ser. No. 61/118,131, filed on Nov. 26, 2008, entitled, "METHOD AND SYSTEM FOR SEARCHING FOR, AND COLLECTING, ELECTRONICALLY-STORED INFORMATION", which is hereby incorporated by reference in its entirety.

TECHNICAL FIELD

The present disclosure generally relates to electronic discovery or e-discovery. More specifically, the present disclosure relates to automated, minimally-invasive methods and systems for collecting electronically stored information from the storage devices of computer systems.

BACKGROUND

Electronic discovery or e-discovery generally refers to any process in which electronically stored information (ESI) is searched for, collected, and analyzed with the intent of using it as evidence in a civil or criminal legal proceeding. In general, electronically stored information includes any type of computer-based information, typically represented as binary numbers, to include e-mail messages, word processing documents, voice mail messages, databases, and websites. Electronically stored information is generally stored on magnetic disks (e.g., computer hard drives and floppy disks), optical disks (e.g., DVDs and CDs), and flash memory devices (e.g., USB drives).

Electronically stored information differs from conventional, paper-based information in several respects. First, because there are so many sources of electronically stored information, the volume of electronically stored information available is typically significantly greater than that of paper-based information. Unlike conventional paper-based information, electronically stored information can be searched for and analyzed by automated computer-based processes. Electronically stored information is often accompanied by meta-data, which is data that relates to or describes the electronically stored information. For example, meta-data may include data that indicates who authored an email, when a file was created or last modified, and so on. Electronically stored information is easily modified, but is often difficult to destroy. For example, simply opening or accessing a word processing document may inadvertently modify meta-data associated with the document. However, deleting the word processing document may not result in permanently removing the document from a storage device of a computer system, thereby leaving open the possibility that the document may be recovered. For these and other reasons, electronically stored information is often extremely important for its evidentiary value in legal proceedings.

Searching for and collecting electronically stored information for use in a legal proceeding poses both legal challenges as well as technical challenges. From a legal perspective, there are rules governing how electronically stored information must be gathered, collected and maintained. Running afoul of these rules may result in sanctions for spoliation—the destruction, alteration or improper maintenance of evidence. From a technical standpoint, a variety of problems exist. The most obvious problem is analogous to the often cited problem of finding a needle in a haystack. That is, given the voluminous amount of electronically stored information available, it is difficult to locate and collect the most relevant information. A variety of issues may make it difficult to find the relevant information. For example, the set of possibly relevant electronically stored information may reside on several (hundreds or even thousands) of different computer systems in varying geographical locations, making it potentially cost prohibitive to perform the necessary searches. Additionally, the format of the relevant electronically stored information may not be known, making it difficult to properly target a search.

One of the more common methods of searching for and collecting electronically stored information involves first creating an exact duplicate of the original evidentiary media. This process is often referred to as imaging. For instance, to generate an image of a hard drive of a computer system, a standalone hard drive duplicator or software imaging tool is generally used to make an exact duplication of the data residing on a hard drive. This duplicate data can then be searched for the relevant information without the fear of inadvertently modifying, deleting or destroying the original. One drawback with this method is that it typically requires a relatively extensive technical expertise, which increases the cost associated with searching for and collecting the relevant information, especially in cases where several hard drives need to be searched on several computer systems. Furthermore, the person who generates the image may not have the skill and knowledge to perform the actual search. Consequently, there is often an increased cost associated with having a first technically skilled person generate an image, and a second person to perform a search of the image. Another problem with this approach is that it may temporarily, if not permanently, render the targeted computer system inoperative. In some circumstances, this may be an unacceptable option for the owner or operator of the target computer system.

Another approach that is often utilized for performing searches for electronically stored information is to install and execute a special search application on a target computer system. Once installed, the search application can be customized to search for relevant electronically stored information on storage devices of the target computer system. Here again, several problems arise. First, installing the search application on the target computer system modifies the file system and possibly components of the operating system, such as a system registry, of the target computer system. This may be undesirable from the perspective of the owner and operator of the target computer system, but more importantly it may give rise to a possible allegation of tampering with or modifying evidence, which can call into question the evidentiary value of any information obtained via the search process. Furthermore, installation of a search application may allow susceptible avenues of attack from malicious processes and nefarious executable agents on target computer systems. Additionally, administrative privileges on the target computer system may be required to perform the installation and/or search, and such privileges may not be available to the operator of the target computer system. In addition, installing and customizing a search application on several target computer systems may prove costly as it may require a person with technical skills to be present at the target computer system for the installation, and subsequent search. For instance, often with conventional search applications, the application must be installed before a search can be configured or customized to locate the relevant electronically stored information.

For the reasons set forth above, there is a need for improved systems and methods for searching for, and collecting, electronically stored information.

SUMMARY

A method and system for searching for and collecting electronically stored information are disclosed. In one embodiment, a search configuration application provides a mechanism for defining search parameters to be included in a search configuration file. These search parameters control the operation of a search agent when the search agent is executed at a target computer system. The search agent is designed such that it need not be installed at the target computer system, but instead is only temporarily placed in the working memory of the target computer system when executing. A search configuration file, which controls the operation of the search agent, is encrypted by the search configuration application, so as to prevent any unauthorized access at the target computer system to the search parameters that may give insight as to the scope of the search. In addition, an encryption key, which is generated at the search configuration application and embedded in the configuration file, is used by the search agent process to encrypt search results prior to writing those results to a search results file. This prevents unauthorized access to the search results. Accordingly, a user of an analysis application must have the proper password or encryption key to access the search results file. Other aspects of the invention will become apparent from the detailed description that follows.

DESCRIPTION OF THE DRAWINGS

Some embodiments are illustrated by way of example and not limitation in the figures of the accompanying drawings in which.

DETAILED DESCRIPTION

Methods and systems for searching for, and collecting, electronically stored information are presented. In the following description, for purposes of explanation, numerous specific details are set forth in order to provide a thorough understanding of example embodiments. It will be evident, however, to one skilled in the art that the present invention may be practiced without these specific details.

Consistent with one embodiment of the invention, the tasks of configuring a search, executing a search, and reviewing the results of a search are facilitated by three separate computer-enabled processes. A first process referred to herein as a search configuration application enables a person with the technical, and possibly legal, knowledge, to address the various technical and legal aspects of configuring a search. The search configuration application generates a search configuration file for use with a search agent process, which performs the actual search of a target computer system. The search configuration file, which is generated by the search agent application, directs the operation of the search agent process when performing a search at a target computer system. By separating—in time and location—the technical aspects of configuring a search, from the execution of the search at the target computer system, an embodiment of the invention advantageously minimizes the amount of user interaction required at the target computer system for the search to be performed. For instance, an owner or operator of the target computer system need do nothing more than initiate the execution of the search agent process. This may be achieved by doing something as simple as selecting a hyperlink on a web page, or by coupling a Universal Serial Bus (USB) flash memory device in a USB port of the target computer system.

In some embodiments, the search configuration file generated at the search configuration application is encrypted, thereby eliminating the possibility that anyone without the proper authorization (e.g. password or encryption key) can access the configuration parameters and determine the scope of the search. In addition, in some embodiments, the search agent process encrypts all search results written to a results file, so as to eliminate the possibility of anyone, without the proper authorization, accessing and viewing the results. In some embodiments, the search agent process and search configuration file are distributed on a removable storage device (e.g., such as a USB flash memory device or USB-based disk drive). The search agent process, in some embodiments, executes on the target computer system without requiring installation on the target computer system. Accordingly, the search can be performed without modifying the file system or any other operating system component. in some embodiments, the search results are written directly to the storage device on which the search agent process and search configuration file are stored, thereby eliminating the need to store the search results on a storage device of the target computer system.

Figure 1:
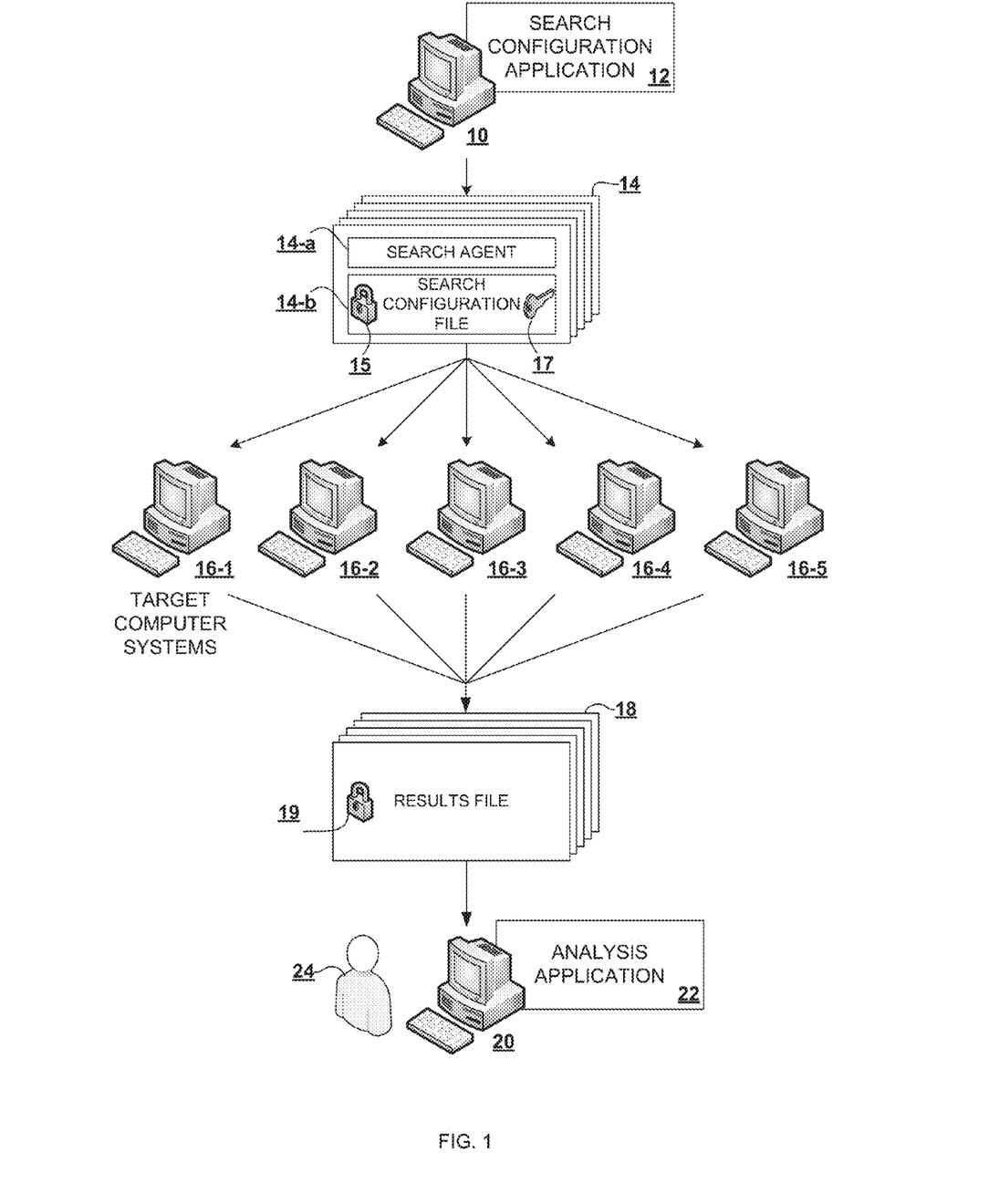
FIG. 1 illustrates at a system level, an example of the various computer systems and applications that may be used in carrying out methodologies consistent with one or more embodiments of the invention.

FIG. 1 illustrates at a system level an example of the various computer systems and applications that may be used in carrying out methodologies consistent with one or more embodiments of the invention. In particular, FIG. 1 shows a first computer system 10 having a search configuration application 12 residing and executing thereon. As described in greater detail in connection with the description of FIG. 2, the search configuration application 12 facilitates the generation of a search configuration file 14-*a* including search parameters that control the operation of a search agent process 14-*b* when the search agent process 14-*a* is performing a search of a target computer system 16. In addition, FIG. 1 shows several target computer systems (e.g., 16-1, 16-2, 16-3, 16-4 and 16-5). In the context of the present disclosure, a target computer system 16 is a computer system at which a search agent process 14-*a* performs a search for electronically stored information. Finally, FIG. 1 shows a computer system 20 having an analysis application 22 residing and executing thereon. The analysis application 22 enables a user to view and analyze the results 18 of a search of a target computer system 14, performed by a search agent process 14-*a*.

The search configuration application 12 executing at the first computer system 10 enables a user to generate a search configuration file 14-*b* that includes various search parameters that are used by a search agent process 14-*a* when performing a search of a target computer system 16. In essence, the search configuration file 14-*b* controls or directs the operation of the search agent process 14-*b*. For example, utilizing the search configuration application 12, a user may specify a variety of search parameters to include the type of data objects (e.g., files, databases, data stores) at the target computer system 14 that are to be searched, and the keywords that are to be searched for within those data objects. Other search parameters are discussed below in connection with the description of FIG. 2. In a preferred embodiment, the search configuration file 12-*b* may be encrypted prior to being packaged with the executable search agent process 12-*a* for delivery to a target computer system. This prevents anyone without access to the proper password or encryption key from identifying the search parameters being used to perform the search. The combination of the search agent process 12-*a* and the search configuration file 12-*b* is referred to herein as a search agent package 12.

Once a user has utilized the search configuration application 12 to both establish the search parameters for a particular search to be performed at one or more target computer systems and to generate the search agent package 14, the search agent package 14 is delivered to a target computer system 16. This may occur in any number of ways. For instance, a user may publish a link to the search agent package 14 on a website, enabling delivery of the search agent package 14 over a network, such as the Internet. Accordingly, a user of a target computer system 16 may be asked to direct a web browser application to an Internet document at a particular address in order to initiate a download of the search agent package 14. For example, a user may be asked to enter a specified universal resource location (URL) representing the address of the Internet document to which the link to the search agent package has been published. Selection of the link may cause the search agent package 14 to automatically be downloaded to the target computer system and in some cases automatically executed. In cases where a target computer system 14 is not connected to a network, the search agent package may be written to a portable and removable memory device, such as a DVD, CD, or USB-based (Universal Serial Bus) flash memory device. This portable memory device may be manually delivered, for example by postal service, courier service or any similar means, to an owner or operator of a target computer system 16, or any other person exercising control over the target computer system. Once received, the owner or operator of the target computer system 16 can initiate a search by inserting the DVD or CD into an appropriate disk drive, or by establishing a connection with the flash memory device, for example, by plugging a USB-based device into a suitable USB port.

As briefly described above, the execution of the search agent process 14-*a* at the target computer system is controlled by the search parameters included in the search configuration file 14-*b*. In addition to controlling what is searched, and what is searched for, additional search parameters may direct the search agent to operate in specific ways. For instance, a search parameter may specify one of several display modes. In one display mode, the entire search process may occur in a "stealth" mode such that no information is displayed to a user of the target computer system. In such a case, the execution of the search occurs with no interaction on the part of the user, other than whatever minimal interactions are necessary to initiate the execution of the search. In another display mode, aspects of the search, such as the search progress, the amount of time remaining for the search to complete, and so on, may be visually communicated to the user. In a preferred embodiment, the results of the search are encrypted and written to a results file. However, in some embodiments, the search results may not be encrypted before they are written to the results file.

The search agent can be executed on the target computer system without being installed on the target computer system. Consequently, no changes to the file system of the target computer system occur. Additionally, no changes to any component (e.g., a system registry) of the operating system occur. Moreover, in some embodiments the results file 18 may be written directly to a portable and removable storage device, so as to prevent any modification whatsoever to the data on the storage devices of the target computer system.

Just as the search agent package 14 may be delivered to the target computer system 16 in any number of ways, the results file 18 may be delivered or communicated to an analyst 24 in a variety of ways. For example, in an embodiment in which the target computer system 16 is capable of communicating over a network, the results file 18 may be delivered to an analyst's analysis application 22 (e.g., executing on computer system 20) via the network. However, in those cases where the target computer system 16 is not connected to a network, the results file 18 may be written to a DVD, CD or flash memory device, and then delivered to the analyst by postal service, courier service, or any similar means.

In some embodiments, once the results file 18 is received at and made available to the analysis application 22, the results file 22 is decrypted prior to being displayed to the analyst 24. Accordingly, to decrypt the results file 18, an analyst 24 must have the proper authorization. For example, the analyst 24 may be required to supply a password, or an encryption key, so that the analysis application 22 can decrypt and access any search results included in the results file 18. As described in greater detail below, in some embodiments, the analysis application protects the host computer system 20 executing the analysis application by creating and virtualizing an encrypted drive to use as a protected storage area. This protected storage area is not accessible to any process other than the analysis application, and it remains wholly under the control of the analysis application at all times. In the rare situation when the analysis application 22 should fail, the protected storage area will still not be accessible to any other applications or processes residing and executing at the host computer system 20.

Figure 2:
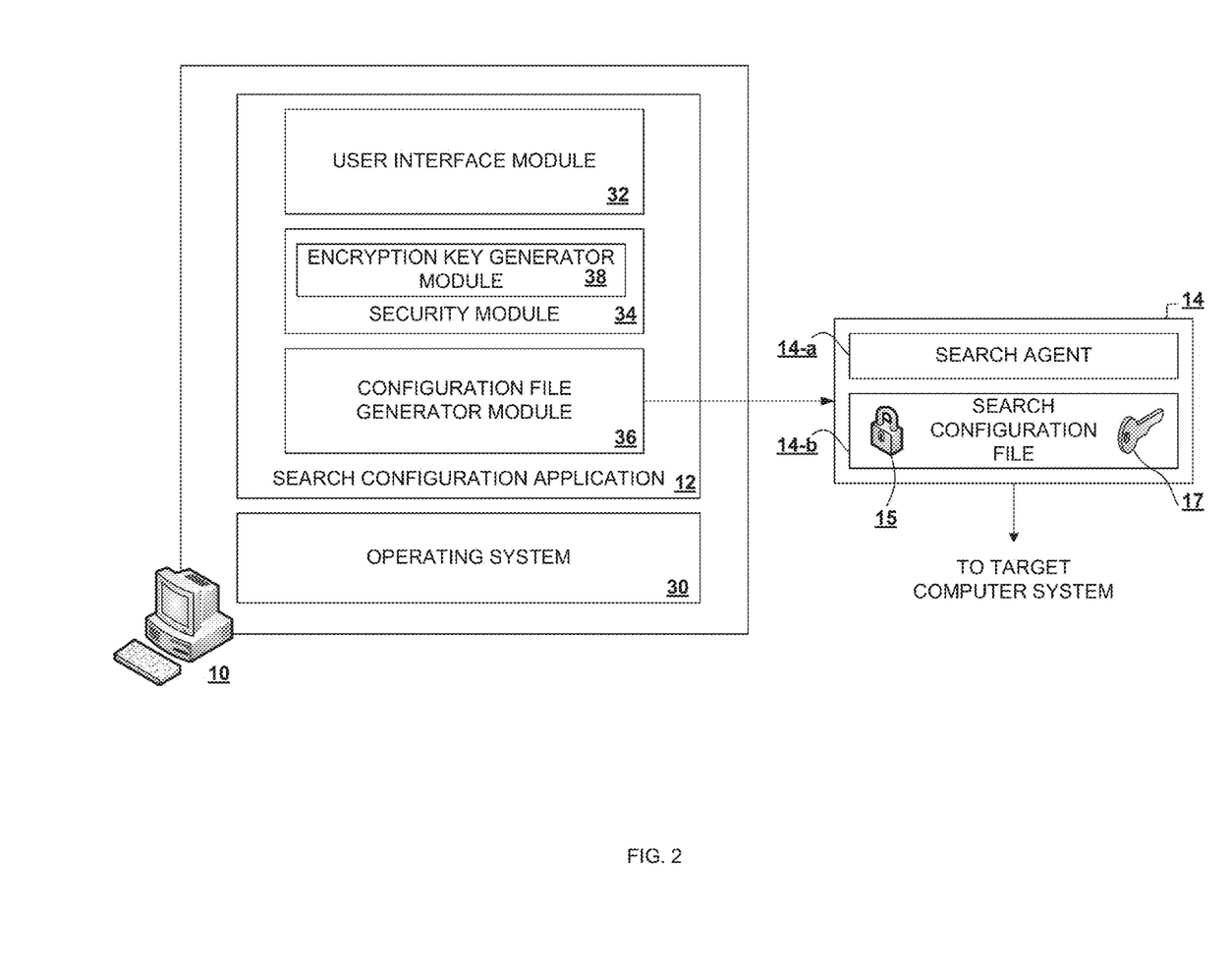
FIG. 2 is a block diagram illustrating various functional modules for use in generating a search configuration file having search parameters that direct the operation of a search agent when performing a search at a target computer system, according to an embodiment of the invention.

FIG. 2 is a block diagram illustrating various functional modules for use in generating a search configuration file 14-*b* having search parameters that direct the operation of a search agent 14-*a* when the search agent 14-*a* is performing a search at a target computer system 16, according to an embodiment of the invention. As illustrated in FIG. 2, the computer system 10 has an operating system 30 and a search configuration application 12 residing and executing thereon. The search configuration application 12 includes a user interface module 32, a security module 34, and a configuration file generator module 36.

In some embodiments, the user interface module 32 works in close conjunction with the operating system 30 to provide a graphical user interface for displaying information to, and receiving information from, a user. Specifically, the user interface module 32 provides a mechanism for viewing and specifying various user-configurable search parameters that are to be included in a particular search configuration file. Of course, in an alternative embodiment, a command line interface may be utilized. In any case, the user interface provided in part by the user interface module 32 allows a user to establish the various search parameters for a particular search. In addition, a user may save a search, recall a previously saved search, modify the search parameters of an existing or previously defined search and so on. A user may also select a particular version of a search agent 14-*a* for use with a particular search configuration file. In some embodiments, the user interface module 32 provides one or more "wizards" which guide the user, in a step-by-step manner, through the process of generating a search configuration file 14-*b* for a search of a target computer system, and pairing the search configuration file 14-*b* with a search agent to generate a search agent package 14.

The security module 34 of the search configuration application 12 provides a mechanism for securing (e.g., encrypting) a search configuration file 14-*b*, thereby preventing anyone who is not authorized to view the search parameters from accessing and viewing the search parameters. As illustrated in FIG. 2, the security module 34 includes an encryption key generator module 38. The security module 34 may require that a user provide a password, which is used by the encryption key generator module 38 to generate an encryption key for use in encrypting the search configuration file 14-*b*. Accordingly, the encryption key may be used to encrypt the search configuration file 14-*b* prior to the time when the search configuration file 14-*b* is delivered to a target computer system. Lock 15 illustrates that the search configuration file 14-*b* is encrypted.

In some embodiments, the security module 34 also provides a mechanism for establishing an encryption key that is to be embedded in the search configuration file (e.g., encryption key 17). This embedded encryption key 17 is used by the search agent 14-*a* when executing at a target computer system to encrypt any search results that are written to a search results file at the target computer system. Accordingly, an owner or operator of the target computer system cannot access or view the search results in a search results file unless he or she provides a proper password or encryption key to decrypt the search results file.

In some embodiments, symmetric encryption algorithms are utilized. Accordingly, the same encryption key that is used to encrypt the search results file is used to decrypt the search results file at the analysis application 22. In some embodiments, asymmetric encryption algorithms are utilized. Accordingly, a private encryption key may be utilized to encrypt the search results file while a public encryption key is used to decrypt the search results file.

The configuration file generator module 36 generates the configuration file 14-*b* that is paired with and controls the operation of a search agent process 14-*a*. The search configuration file may include a wide variety of search parameters. For example using the search configuration application 12 a user may establish one or more keywords that are to be used in a keyword search of data objects at the target computer system. In some embodiments, the search configuration application 12 may automatically generate additional keywords based on a user provided keyword, such that variations of a user-provided keyword are included in a particular search. For instance, if a user-selected keyword or search term is "invest," the search configuration application will add variations of the word, such as "investment."

Another search parameter that may be specified is the type of data object to be searched. For example, a user may specify a particular file type (e.g., by file extension) to indicate what types of data objects should be searched. For instance, it may be desirable to perform a search at the target computer system of e-mail exclusively, or alternatively, only word processing documents, and so forth. By specifying a particular file extension as a search parameter the configuration file can dictate to the search agent what types of data objects at the target computer system are to be searched.

A search parameter in the search configuration file 14-*b* may also specify that the search agent 14-*a* is to perform targeted searches of certain meta-data associated with various data objects. For example, a search parameter may specify a date and/or time for use in a search to identify electronically stored information with meta-data indicating, for example, that the electronically stored information was generated before or after the specified date and/or time. In another example, a search parameter may specify a user ID or name to be used in a search of meta-data associated with one or more data objects to identify those data objects that were authored, accessed or modified by a particular person. Search parameters may specify other particular meta-data attributes to be searched as well.

In yet another example, a user may specify as a search parameter a keyword to be used in a search for the purpose of filtering data objects. For example, based on determining the presence of the keyword within a particular data object, the search agent will filter the data object so as to exclude (or include) the data object in the search results file. Another user-specified search parameter may specify one or more text encoding types to be used in performing a search. These encoding types might include any one of, or all of, ASCII, UTF7/8/32, Unicode, Big Endian Unicode or any other custom code page. Accordingly, when the search agent is performing a keyword search, the search agent may search for the keyword in any one of the user-specified encodings.

Although many of the search parameters directly affect the manner in which the search is performed, some search parameters affect the operation of the search agent process more generally. For example, a user may specify a search parameter that instructs the search agent process to write search results to a particular location. For instance the search parameter may indicate that the search results are to be written to a file, and the file stored on a storage device of the target computer system. Alternatively, a search parameter may direct the search agent to write the search results to a portable and/or removable storage device, such as a DVD, CD or USB-based flash memory device. This portable and removable storage device may be the same portable and removable storage device on which the search agent and search configuration file reside. Another search parameter may specify a particular display mode in which the search agent process is to execute. For instance in some embodiments, a search parameter specified in the search configuration file may instruct the search agent process to operate in a stealth mode. In such a mode note information regarding the search is communicated or displayed to the user in any way. Other display modes may direct the search agent process to display various information about the search process. For instance the progress of the search the time remaining until the search is complete and similar information may be communicated visually to a user of the target computer system.

After a user has entered all of the various search parameters that are required for a given search the user can direct the search configuration application to generate a search agent package to be delivered to a target computer system. The search agent package includes both the search agent process and its associated search configuration file. In some embodiments the search agent process may be customized depending upon the operating system or other attributes of the target computer system. In at least one embodiment the search agent process is a binary encrypted file and exists in the minimum designed form having full functionality of less than 4906 bytes. In alternative embodiments it may exist in the form of a greater number of bytes having additional functionality as determined based on user-selected inputs at the search configuration application 12.

As discussed briefly above, the mechanism for delivering the search agent package 14 to the target computer system 16 may vary widely. In some embodiments, where the target computer system 16 is likely to have network connectivity, the search agent package 14 may be published to a website so that it is accessible to a target computer system 16 via the World Wide Web. Accordingly, an owner or operator of the target computer system 16 may be instructed to download the search agent package 14 from a particular website. In some embodiments, the search configuration application 12 includes functionality for automatically publishing the search agent package 14 to a website. For example, the search configuration application 12 may be preconfigured to publish the search agent package 14 to a particular website.

In some embodiments, particularly in cases when there is a high likelihood that a target computer system will not have network access, the configuration file generator module 36 writes the search agent package 14 to a portable storage device, such as a DVD, CD or USB-based flash memory device. In such a scenario, the portable storage device can be manually transported, for example, by postal service or courier service to the location of the target computer system.

Figure 3:
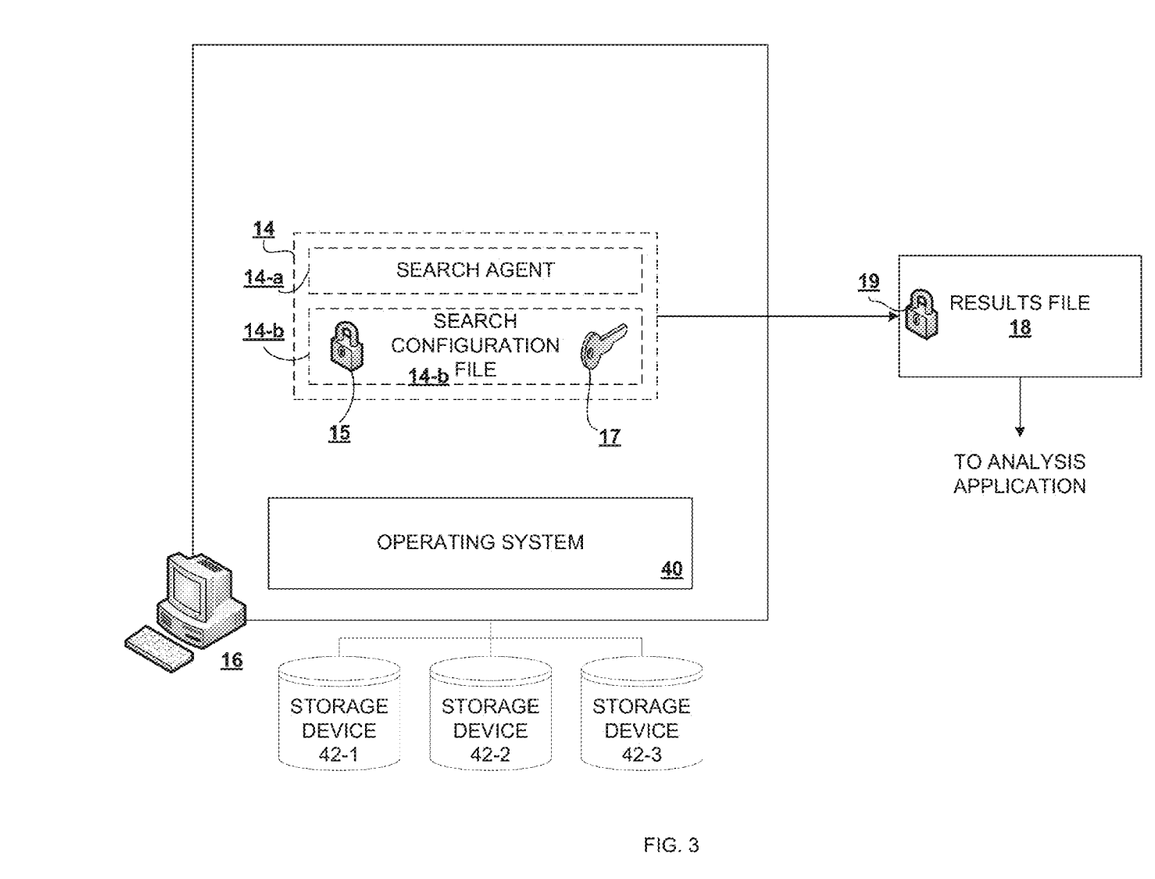
FIG. 3 is a block diagram illustrating various functional modules, to include a search agent process and a search configuration file, for use in performing a search operation at a target computer system, according to an embodiment of the invention.

FIG. 3 is a block diagram illustrating various functional modules, to include a search agent 14-*a* and a search configuration file 14-*b*, for use in performing a search operation at a target computer system 16, according to an embodiment of the invention. Although represented in FIG. 3 as a personal computer, in one embodiment of the invention, the target computer system 14 may be a workstation, server, laptop, notebook, mobile phone, personal digital assistant. Accordingly, the search agent 14 can be customized depending upon the type of target computer system 16 that is being searched.

As shown in FIG. 3, the target computer system 14 has residing and executing thereon an operating system 40. In some embodiments the operating system is some variant of a Microsoft Windows® operating system. However, in alternative embodiments, the operating system 40 may be a variety of the UNIX operating system. The search agent, because it is not installed, is customized to suit the operating system 40 of the target computer system 16. In addition, the target computer system 16 has attached thereto several storage devices 42-1, 42-2 and 42-3. The search agent package 14 including the search agent process 14-*a* and the search configuration file 14-*b* are shown in FIG. 3 as being represented with a dotted line to show that the search agent process 14-*a* is not permanently installed on the target computer system 16. Instead the search agent 14-*a* is only temporarily written into the working memory space of the target computer system 16 during execution of the search agent process.

The search agent 14-*a* operates at the target computer system 16 in accordance with the search parameters specified in the search configuration file 14-*b*. For instance, the display mode of the search is dependent upon how the search was originally configured by a user using the search configuration application 12. In addition, the location to which the results file 18 is written is dependent upon a search parameter specified in the configuration file 14-*b* by a user during the initial configuration of the search. In a preferred embodiment, the results file 18 will be written to a portable storage device so as to eliminate the need for writing any data to the storage devices 42-1, 42-2 and 42-3 of the target computer system 16. As indicated by the lock 19 in FIG. 3, the results file 16 is encrypted. For example, the search agent 14-*a*, utilizing an encryption key 17 included in the search agent package 14, encrypts the search results as the search results are written to the results file 18. Consequently, at the target computer system, only the search agent 14-*a* will have access to the encryption key 17, and thus, only the search agent 14-*a* will have access to the encrypted results file 18.

Figure 4:
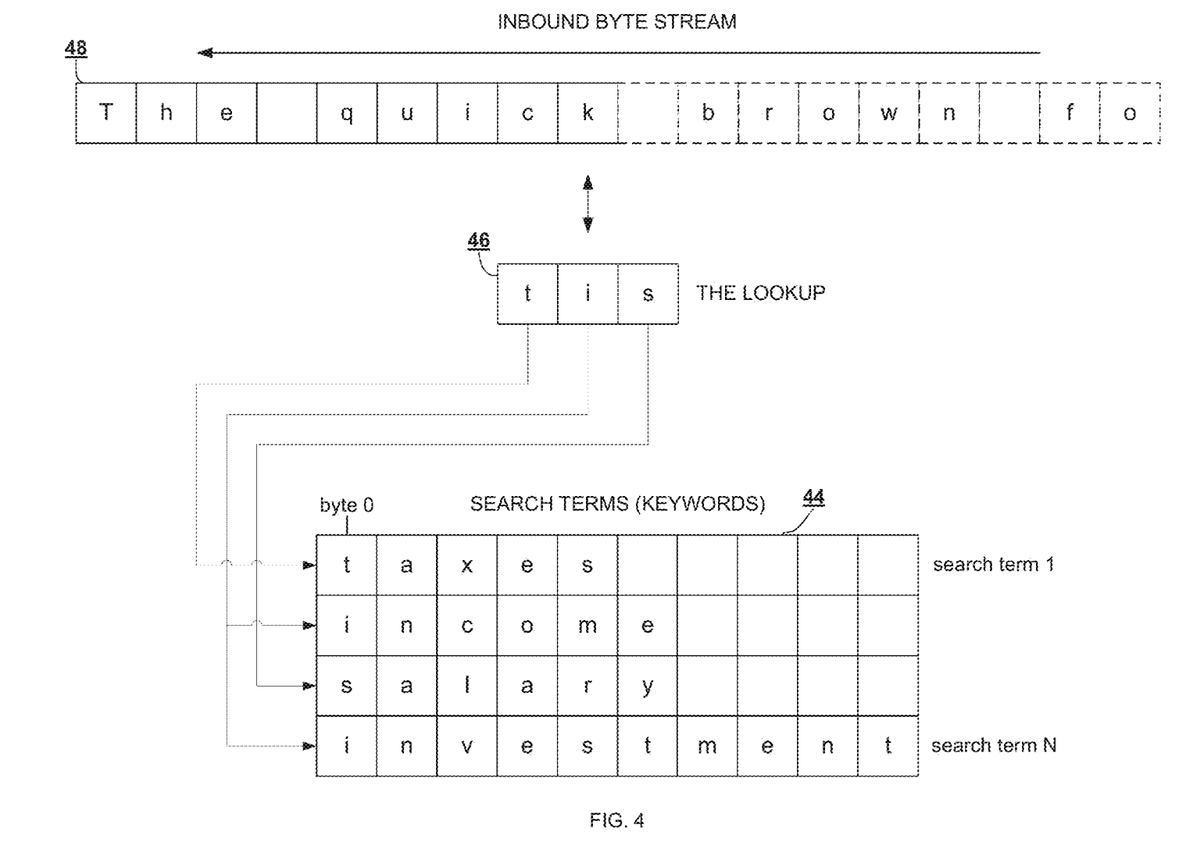
FIG. 4 is a block diagram showing details of how a fast keyword search is performed at a target computer system, according to an embodiment of the invention.

In some embodiments, a fast search algorithm is utilized to improve the performance of the search performed at the target computer system 16. FIG. 4 is a block diagram showing details of how a fast keyword search is performed at a target computer system 16, according to an embodiment of the invention. During a search using the fast search algorithm, each keyword or search term is encoded in each of the user specified encodings, and then each is converted to a byte array. Each byte array is then conceptually stacked such that the search terms can be thought of as being vertically stacked on top of one another. For instance, byte zero for search term one is stacked above byte zero for search term two, and so on. At this point the search terms are logically aligned as a search term array grid 44 where the search terms are orthogonal and the (encoded) characters of the search terms are stacked vertically, as illustrated in FIG. 4. For instance, in FIG. 4 the search term "taxes" is stacked above the search term "income," which is in turn stacked above the search term "salary" and finally "investment." It will be appreciated by those skilled in the art that, to aid in conveying the concept, the characters shown in FIG. 4 have not been encoded, but instead, are shown in their original character format.

Next, the first characters in the first vertical column (e.g., byte zero of each search term) are examined and a further short array is produced that lists only the distinct characters, without any duplicate characters. This short array is referred to as "the lookup" 46. For instance, referring again to FIG. 4, the search term "income" and the search term "investment" both begin with the letter "i". In determining the lookup 46, because the letter "i" occurs as byte zero in both "income" and "investment," only a single instance of the letter "i" is included in the "lookup" 46. By eliminating duplicate letters, generally the lookup 46 can be kept relatively small and can be used to quickly isolate areas of an inbound data stream 48 containing one of the search terms.

As shown in FIG. 4, each element in the lookup 46 is linked with one or more horizontal lines (e.g., search terms) in the search term grid 44, where the lookup byte matches the first byte (e.g., byte 0) of each term in the search term array. Each data object to be searched (e.g., a computer file or e-mail) is processed via an inbound byte stream where every bite in the stream is compared only to the bytes in the lookup. This generally leads to an inbound byte being rejected immediately as a non-match and therefore considerably speeds up the search process. If an inbound byte represents a potential search term match, then the lookup 46 provides a link to each horizontal grid position that must be checked. If more than one horizontal line must be checked (e.g., as with the letter "i" in the example of FIG. 4) then further lookups 46 are generated for the vertical lines in the required horizontal grid positions. For example, a lookup for byte one of the search terms would include the characters (or the encoded representation thereof) for the letters "a" and "n". These additional lookups are cached for future use. These additional lookups are then checked through sequential positions of the inbound byte stream until either it has been determined that none of the search terms are found or a search term is present. If only one horizontal line must be checked, meaning there is only one search term, then the search term is simply checked sequentially against the inbound stream. The outcome of this approach is that much of the inbound byte stream can be discarded very quickly, thereby reducing the time it takes to search the electronically stored information.

Figure 5:
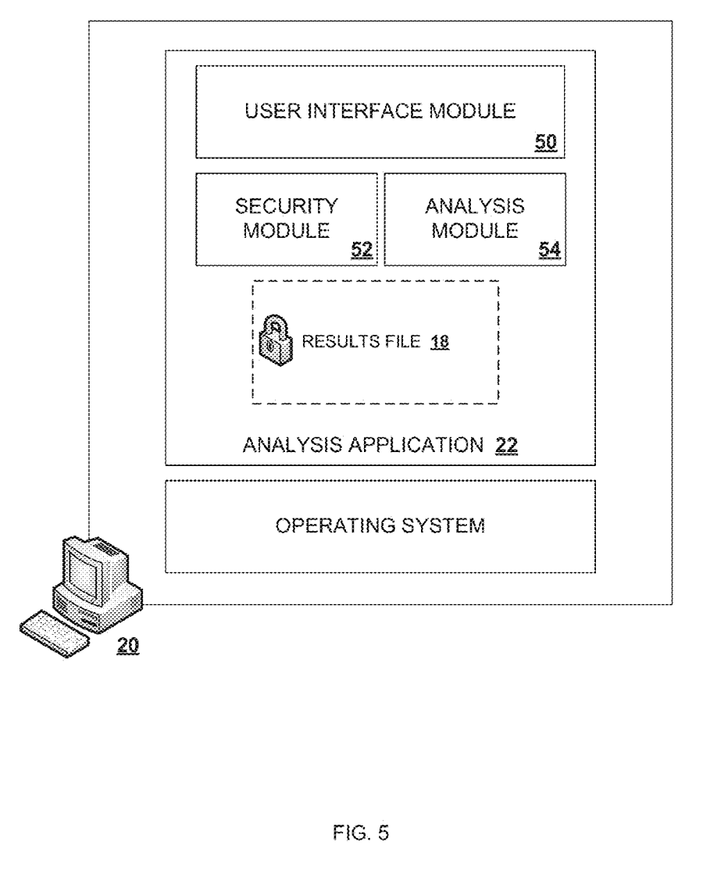
FIG. 5 is a block diagram illustrating various functional modules of an analysis application for use in analyzing search results of a search configured at a first computer system and performed at a target computer system, according to an embodiment of the invention.

FIG. 5 is a block diagram illustrating various functional modules of an analysis application for use in analyzing search results of a search configured at a first computer system 10 and performed at a target computer system 16, according to an embodiment of the invention. As illustrated in FIG. 5, the computer 20 executing the analysis application 22 includes an operating system 56, which may vary depending upon the implementation. The analysis application 22 executing on and residing on computer 20 includes a user interface module 50, a security module 52 and an analysis module 54. Here again the results file is shown as a dotted line to indicate that the results file is written to a protected storage area under the control of the analysis application so as to prevent any search results from permanently contaminating the computer system 20.

The user interface module 50 enables a user to interact with the analysis application 22. Using the user analysis application 22 a user may select a results file from any of multiple searches. Typically a user will have to provide a password to successfully access and decrypt a particular results file. For example, in one embodiment the password that enables access to the results file is the same password that a user of the search application configuration used to initially encrypt the configuration file. Hence even a user with access to the analysis application cannot access a particular results file unless that user has been previously authorized, and provided with the proper password or encryption key. The security module 52 provides this password protection.

The analysis module 54 provides a mechanism by which a user of the analysis application 22 can interact with and analyze the search results. For example, when viewing the search results in a results file 18, a user can list, filter, review, print or search any or all of the data objects as required. As described below, in some embodiments, the actions a user may take with respect to a particular results file 18 will depend on a configuration parameter established by a user using the search configuration application 12. Accordingly, a user may be prevented from printing or transferring any search results from the search results file. In some embodiments the context or meta-data associated with each data object is displayed along with the data object.

In addition to protecting against unauthorized access to the results file 18, the security module 52 provides a mechanism for preventing the computer system 20 that is executing the analysis application 22 from being contaminated with electronically stored information from a results file 18. For instance, to prevent any data object included in a results file from inadvertently contaminating the host computer 18 at which the analysis application is residing and executing, the security module 52 protects the host computer system 18 by creating and virtualizing an encrypted drive to use as a protected storage area. This protected storage area is inaccessible to any process or application executing at the host computer system 18, with the exception of the analysis application that created the protected storage area. The protected storage area remains wholly under the control of the analysis application 22 at all times. In the rare case that the analysis application 22 should fail and terminate, the protected storage area remains inaccessible to other processes and applications executing at the host computer system 20. The protected storage area is created as the analysis application begins execution, and the protected storage area is removed when the analysis application is halted or terminated. The protected storage area is used to decrypt and decompress any search results from the results file. By utilizing the protected storage area, the analysis application prevents unwanted and inadvertent contamination of the host computer system 20 with potentially sensitive electronically stored information.

In some embodiments, the analysis application 22 can be configured such that it will not allow user to copy a data object or print a data object from the results file, although the user will be able to both view and analyze, for example filter, search and so forth, any of the data objects included in the search results file 18. The configuration parameter that prevents the user from copying or printing a data object from the results file 18 is embedded in the results file itself, and hence, the restriction cannot be circumscribed by altering a configuration setting of the analysis application itself. This provides a mechanism by which the person establishing the configuration file 12-b can control the level of access and permissions allowed by a user of the analysis application 22 with respect to a certain set of search results.

Figure 6:
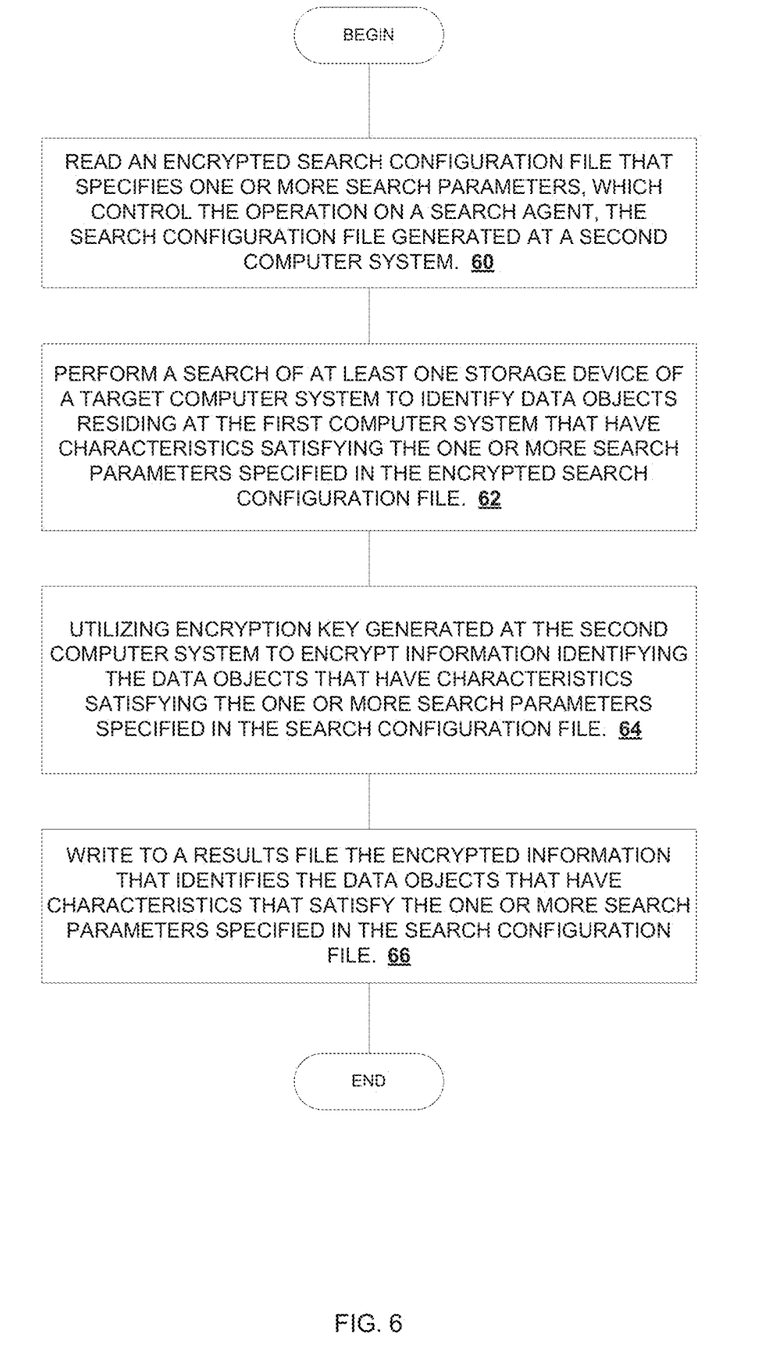
FIG. 6 illustrates a method, according to one embodiment of the invention, for performing a search to collect data at a target computer system.

FIG. 6 illustrates a method, according to one embodiment of the invention, for performing a search to collect data at a target computer system. The method begins at method operation 60 when a search agent executing at a target computer system reads an encrypted search configuration file that specifies one or more search parameters. These search parameters, which were generated by a user using a search configuration application executing at a computer system other than the target computer system, control the operation of the search agent when the search agent is performing a search of a target computer system.

At method operations 62, after reading one or more search parameters, the search agent performs a search of at least one storage device of the target computer system. During the search, the search agent identifies those data objects residing on the storage devices of the target computer system that satisfy the various search parameters specified in the search configuration file. For instance, the search agent may identify those data objects of a particular type (e.g., e-mails), which contain one or more keywords or search terms specified in the search configuration file. Note that one or more of the search parameters specified in the search configuration file may control aspects of how the search agent operates. For example the display mode as well as the location to which the results file is written may be determined based on search parameters established by a user of a search configuration application and included in the search configuration file. In addition a search parameter may specify a particular search algorithm to be utilized by the search agent when performing the search for electronically stored information. For instance in some embodiments, a search parameter may indicate that a fast search algorithm, as is described in connection with FIG. 4, is to be used.

At method operation 64, the search agent utilizes an encryption key, which was previously generated by the search configuration application and embedded into the search configuration file or search agent, to encrypt information identifying data objects that have characteristics satisfying the one or more search parameters specified in the search configuration file. For instance when the search agent identifies a data object that satisfies the search parameters, the search agent encrypts that data object, or the information identifying that data object, before inserting that information into a results file. The information that is encrypted is itself dependent upon a search parameter. For example, a search parameter in the search configuration file may specify that the data object satisfying the search parameters is to be included in the search results. Alternatively, a search parameter may specify that only information identifying a data object is to be included in the search results file. In any case, because the information is encrypted, an owner or operator of the target computer system is prevented from accessing or displaying results of the search. Only a user who has access to the proper password or encryption key will have access to the search results file. Finally, at method operations 66 the encrypted search results are written to a results file.

Figure 7:
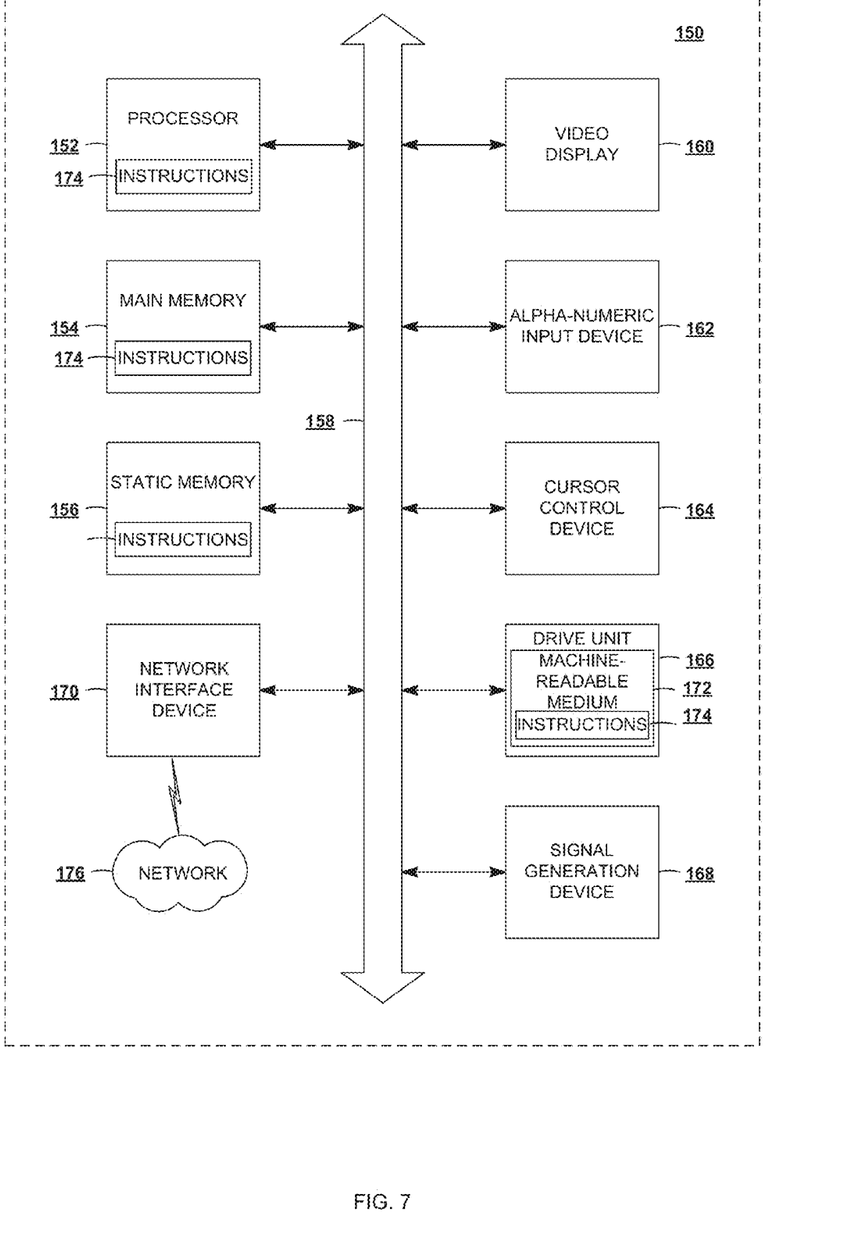
FIG. 7 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system 150 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client framework, or as a peer machine in a peer-to-peer (or distributed) network environment. The machine may be a server computer, a client computer (e.g. user computer), a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 150 includes a processor 152 (e.g., a central processing unit (CPU) a graphics processing unit (GPU) or both), a main memory 154 and a static memory 156, which communicate with each other via a bus 158. The computer system 150 may further include a video display unit 160 (e.g., a liquid crystal display (LCD) or a cathode ray tube (CRT)). The computer system 150 also includes an alphanumeric input device 162 (e.g., a keyboard), a cursor control device 164 (e.g., a mouse), a disk drive unit 166, a signal generation device 168 (e.g., a speaker) and a network interface device 170.

The disk drive unit 166 includes a machine-readable medium 172 on which is stored one or more sets of instructions (e.g., software 174) embodying any one or more of the methodologies or functions described herein. The software 174 may also reside, completely or at least partially, within the main memory 154 and/or within the processor 152 during execution thereof by the computer system 150, the main memory 154 and the processor 152 also constituting machine-readable media.

The software 174 may further be transmitted or received over a network 176 via the network interface device 170.

While the machine-readable medium 172 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of collecting data at a first computer system, the method comprising:
reading an encrypted search configuration file specifying at least one search parameter, the encrypted search configuration file generated at a second computer system to prevent any process executing at the first computer system, other than a search agent performing a search, from reading search parameters that control operation of the search agent performing a search;
performing a search of at least one storage device of the first computer system to identify data objects residing thereon and having characteristics that satisfy the at least one search parameter specified in the encrypted search configuration file;
utilizing an encryption key generated at the second computer system to encrypt information identifying the data objects having characteristics that satisfy the at least one search parameter specified in the search configuration file; and
writing to a results file the encrypted information identifying the data objects having characteristics that satisfy the at least one search parameter specified in the search configuration file.

2. The computer-implemented method of claim 1, further comprising:
utilizing the encryption key generated at the second computer system to encrypt the data objects having characteristics that satisfy the at least one search parameter specified in the search configuration file; and
writing to the results file the encrypted data objects having characteristics that satisfy the at least one search parameter specified in the search configuration file.

3. The computer-implemented method of claim 1, wherein the at least one search parameter specified in the search configuration file is one of: a keyword to be used in a keyword search of the data objects; a file extension to indicate a type of data object on which the search is to be performed; a date and time to be used in a date and time search of the data objects; a name to be used in identifying data objects authored, modified, read or saved by a particular person; a keyword to be used in filtering the data objects for inclusion or exclusion in the results file; a text encoding specifying an encoding to be used when searching for a keyword within the data objects; an address or path indicating a device and/or directory to which the results file is to be written; or, a directive indicating a processing display mode.

4. The computer-implemented method of claim 1, wherein reading the search configuration file, performing the search, utilizing the encryption key to encrypt information, and writing the file including the encrypted information do not result in any modifications to a file system of the first computer system.

5. The computer-implemented method of claim 1, wherein reading the search configuration file, performing the search, utilizing the encryption key to encrypt information, and writing the file including the encrypted information do not result in any modifications to any component of the operating system of the first computer system.

6. The computer-implemented method of claim 1, wherein reading the encrypted search configuration file specifying at least one search parameter includes reading the encrypted search configuration file from a removable storage device communicatively coupled with the first computer system and decrypting the encrypted search configuration file with an encryption key.

7. The computer-implemented method of claim 1, wherein writing to a results file the encrypted information identifying the data objects having characteristics that satisfy the at least one search parameter specified in the search configuration file includes writing the results file to a removable storage device communicatively coupled with the first computer system.

8. The computer-implemented method of claim 1, wherein writing to a results file the encrypted information identifying the data objects having characteristics that satisfy the at least one search parameter specified in the search configuration file includes writing the results file to an address or path of a device and/or directory specified in a search parameter read from the search configuration file.

9. A computer-implemented method of directing a search for data on a storage device of a remote computer system, comprising:
  generating at a first computer system an encrypted search configuration file for use by a search agent process to be executed at the remote computer system, the encrypted search configuration file encrypted at the first computer system to prevent any process executing at a remote computer system, other than a search agent performing a search, from reading search parameters that control operation of the search agent performing the search, the search configuration file including an encryption key generated at the first computer system and at least one user-specified search parameter, the search agent process, when executed at the remote computer system, to:
    perform a search of at least one storage device of the remote computer system to identify data objects residing thereon and having characteristics that satisfy the at least one user-specified search parameter included in the search configuration file;
    utilize the encryption key generated at the first computer system and included in the search configuration file to encrypt information identifying the data objects having characteristics that satisfy the at least one search parameter included in the search configuration file; and
    write to a results file the encrypted information identifying the data objects having characteristics that satisfy the at least one search parameter specified in the search configuration file; and
  providing the search agent process and the encrypted search configuration file to the remote computer system.

10. The computer-implemented method of claim 9, wherein the at least one search parameter included in the search configuration file is one of: a keyword to be used in a keyword search of the data objects; a file extension to indicate a type of data object on which the search is to be performed; a date and time to be used in a date and time search of the data objects; a name to be used in identifying data objects authored, modified, read or saved by a particular person; a keyword to be used in filtering the data objects for inclusion or exclusion in the results file; a text encoding specifying an encoding to be used when searching for a keyword within the data objects; an address or path indicating a device and/or directory to which the results file is to be written; or, a directive indicating a processing display mode.

11. A non-transitory computer-readable storage medium having encoded thereon a set of instructions embodying a search agent process and an encrypted search configuration file for use by the search agent process, the encrypted search configuration file generated at a second computer system to prevent any process executing at the first computer system, other than a search agent performing a search, from reading search parameters that control operation of the search agent performing a search and including an encryption key and at least one search parameter, and the instructions, when executed by a processor of a first computer system, cause the first computer system to perform a method comprising:
  reading from the search configuration file the at least one search parameter, the search configuration file generated at a second computer system;
  performing a search of at least one storage device of the first computer system to identify data objects residing thereon and having characteristics that satisfy the at least one search parameter read from the search configuration file;
  utilizing the encryption key included in the search configuration file to encrypt information identifying the data objects having characteristics that satisfy the at least one search parameter specified in the search configuration file; and
  writing to a results file the encrypted information identifying the data objects having characteristics that satisfy the at least one search parameter specified in the search configuration file.

12. The computer-readable medium of claim 11 having further instructions, which, when executed by the processor of the first computer system, cause the first computer system to perform additional method operations comprising:
  utilizing the encryption key generated at the second computer system to encrypt the data objects having characteristics that satisfy the at least one search parameter specified in the search configuration file; and
  writing to the results file the encrypted data objects having characteristics that satisfy the at least one search parameter specified in the search configuration file.

13. The computer-readable medium of claim 11, wherein the search configuration file is encrypted at the second computer system to prevent any process executing at the first computer system, other than the search agent process per the search, from reading search parameters that control operation of the search agent process performing the search.

14. The computer-readable medium of claim 11, wherein the at least one search parameter specified in the search configuration file is one of: a keyword to be used in a keyword search of the data objects; a file extension to indicate a type of data object on which the search is to be performed; a date and time to be used in a date and time search of the data objects; a name to be used in identifying data objects authored, modified, read or saved by a particular person; a keyword to be used in filtering the data objects for inclusion or exclusion in the results file; a text encoding specifying an encoding to be used when searching for a keyword within the data objects; an address or path indicating a device and/or directory to which the results file is to be written; or, a directive indicating a processing display mode.

15. The computer-readable medium of claim 11, wherein reading a search configuration file, performing a search, utilizing an encryption key to encrypt information, and writing a file including the encrypted information do not result in any modifications to a file system of the first computer system.

16. The computer-readable medium of claim 11, wherein reading a search configuration file, performing a search, utilizing an encryption key to encrypt information, and writing a file including the encrypted information no not result in any modifications to any component of the operating system of the first computer system.

17. The computer-readable medium of claim 11, wherein reading an encrypted search configuration file specifying at least one search parameter includes reading the encrypted search configuration file from a removable storage device communicatively coupled with the first computer system and decrypting the encrypted search configuration file with an encryption key.

18. The computer-readable medium of claim 11, wherein writing to a results file the encrypted information identifying the data objects having characteristics that satisfy the at least one search parameter specified in the search configuration file includes writing the results file to a removable storage device communicatively coupled with the first computer system.

19. The computer-readable medium of claim 11, wherein writing to a results file the encrypted information identifying the data objects having characteristics that satisfy the at least one search parameter specified in the search configuration file includes writing the results file to an address or path of a device and/or directory to specified in a search parameter read from the search configuration file.

20. A non-transitory computer-readable storage medium having encoded thereon a set of instructions embodying a search configuration application, the instructions, when executed by one or more processors, cause the one or more processors to perform one or more of the following method operations:
generate at a first computer system a search configuration file for use by a search agent process to be executed at the remote computer system, the search configuration file generated at a second computer system to prevent any process executing at the first computer system, other than a search agent performing a search, from reading search parameters that control operation of the search agent performing a search and including an encryption key generated at the first computer system and at least one user-specified search parameter, the search agent process, when executed at the remote computer system, to:
perform a search of at least one storage device of the remote computer system to identify data objects residing thereon and having characteristics that satisfy the at least one user-specified search parameter included in the search configuration file;
utilize the encryption key generated at the first computer system and included in the search configuration file to encrypt information identifying the data objects having characteristics that satisfy the at least one search parameter included in the search configuration file; and
write to a results file the encrypted information identifying the data objects having characteristics that satisfy the at least one search parameter specified in the search configuration file; and
provide the search agent process and the encrypted search configuration file to the remote computer system.

21. The computer-readable medium of claim 20, wherein the at least one search parameter included in the search configuration file is one of: a keyword to be used in a keyword search of the data objects; a file extension to indicate a type of data object on which the search is to be performed; a date and time to be used in a date and time search of the data objects; a name to be used in identifying data objects authored, modified, read or saved by a particular person a keyword to be used in filtering the data objects for inclusion or exclusion in the results file; a text encoding specifying an encoding to be used when searching for a keyword within the data objects; an address or path indicating a device and/or directory to which the results file is to be written; or, a directive indicating a processing display mode.

* * * * *

UNITED STATES PATENT AND TRADEMARK OFFICE
CERTIFICATE OF CORRECTION

PATENT NO.         : 8,392,706 B2
APPLICATION NO.    : 12/626517
DATED              : March 5, 2013
INVENTOR(S)        : Spencer et al.

Page 1 of 1

It is certified that error appears in the above-identified patent and that said Letters Patent is hereby corrected as shown below:

In the Claims

In column 16, line 35, in claim 12, delete "haying" and insert --having--, therefor In column 16, line 49, in claim 13, delete "per" and insert --performing--, therefor In column 17, line 7, in claim 16, delete "no" and insert --do--, therefor In column 18, line 32, in claim 21, after "person", insert --;--, therefor Signed and Sealed this
Ninth Day of December, 2014

Michelle K. Lee
*Deputy Director of the United States Patent and Trademark Office*